United States Patent
Rohde et al.

[19]

[11] Patent Number: 5,882,555
[45] Date of Patent: Mar. 16, 1999

[54] APPARATUS AND METHOD FOR MANUFACTURING COMPACT DISCS HAVING A NON-ROUND OUTER PROFILE

[75] Inventors: Joern Rohde, Berlin, Germany; Hartwig Rinke, Glen Mills, Pa.

[73] Assignee: Discart, Inc, Chestnut Ridge, N.Y.

[21] Appl. No.: 765,083

[22] PCT Filed: Feb. 29, 1996

[86] PCT No.: PCT/US96/02725

§ 371 Date: Dec. 20, 1996

§ 102(e) Date: Dec. 20, 1996

[87] PCT Pub. No.: WO97/18942

PCT Pub. Date: May 29, 1997

[51] Int. Cl.⁶ .............................. B29D 11/00; B29D 17/00
[52] U.S. Cl. ........................ 264/1.33; 264/2.7; 264/162; 369/280; 425/295; 425/810
[58] Field of Search ..................... 264/1.33, 2.7, 264/106, 107, 162; 83/565; 156/153; 425/292, 295, 810; 369/280

[56] References Cited

U.S. PATENT DOCUMENTS

| | | | |
|---|---|---|---|
| 1,479,847 | 1/1924 | Widmann | 369/280 |
| 5,108,789 | 4/1992 | Michael et al. | 264/2.7 |
| 5,346,654 | 9/1994 | Kodaka et al. | 264/1.33 |

*Primary Examiner*—Mathieu D. Vargot
*Attorney, Agent, or Firm*—Londa and Traub LLP

[57] ABSTRACT

An apparatus and method for manufacturing compact discs (2) having a non-circular outer profile (8) includes imprinting digital information in an annular region (12) on the under face of a compact disc blank (36) such that an outer limit (14) of the annular region (12) does not extend beyond the innermost reach (16) of the edge of the compact disc (2) in its final shape, forming a first alignment mark (20a, 20b) on the blank (36), applying a label (22) to the upper face of the blank (36), orienting the blank (36) on a manufacturing platform (26) by aligning the first alignment mark (20a, 20b) with respect to an alignment mark (34a, 34b) on the manufacturing platform (26), securing the blank (36) against rotation with respect to the platform (26) and shaping the blank (36) into its final shape by removing portions of the blank with a grinding tool (44) which cooperates with a form (38) to provide the final shape.

28 Claims, 4 Drawing Sheets

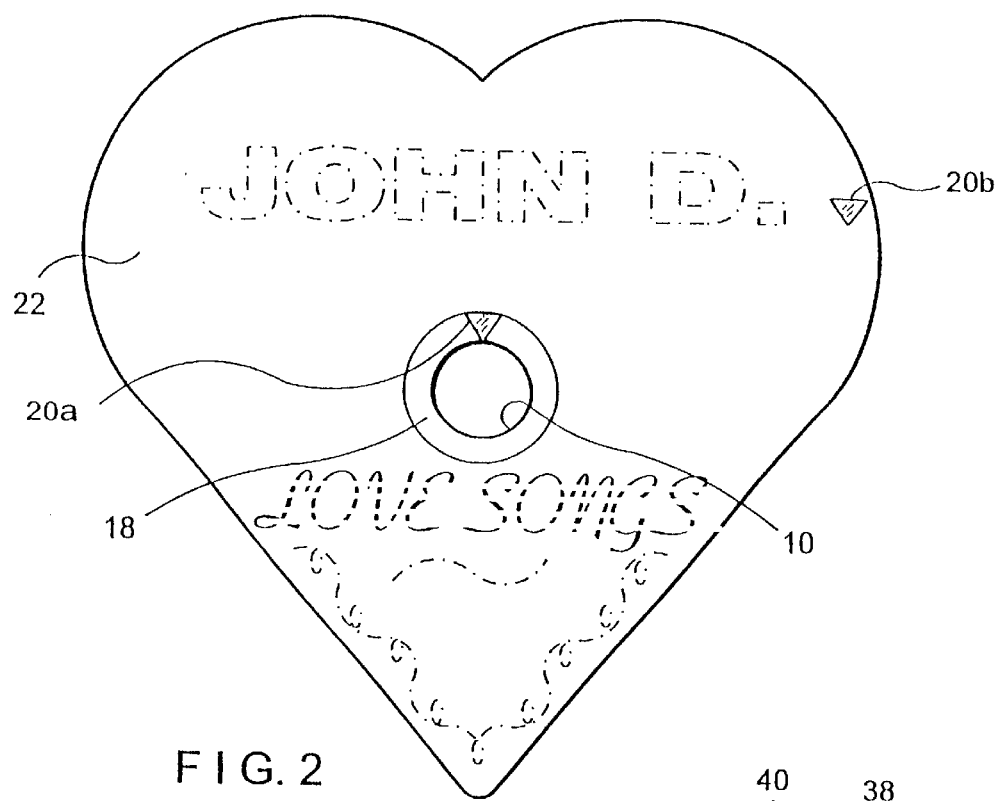
FIG. 2
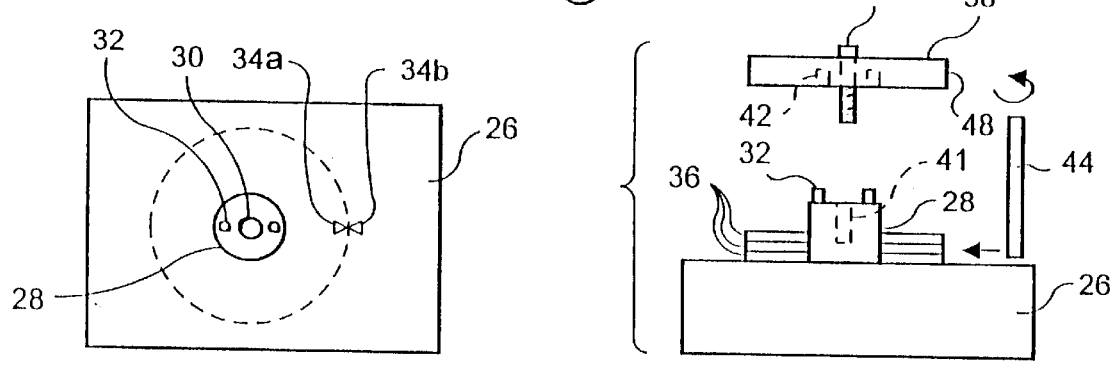
FIG. 3A
FIG. 3C
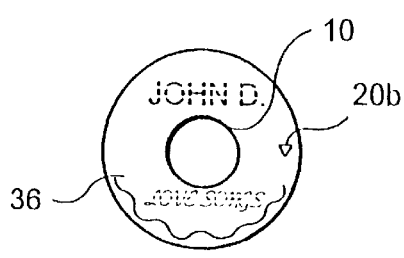
FIG. 3B
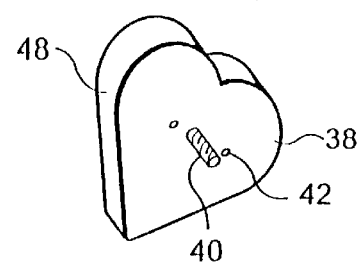
FIG. 3D

5,882,555

APPARATUS AND METHOD FOR MANUFACTURING COMPACT DISCS HAVING A NON-ROUND OUTER PROFILE

BACKGROUND OF THE INVENTION

The present invention relates to compact discs and related devices, such as CD-ROMs, laser discs and cleaning CD's, having a profile other than circular. In particular, the invention relates to processes for manufacturing this novel type of compact disc.

Presently, all compact discs have a circular profile shape. It is common that a label containing artwork or other visually readable material is applied to the upper, non-functional face of the compact disc. Since the normal compact disc is round, the label may be applied in any radial direction so long as the label is properly centered.

However, the orientation of a non-round compact disc changes about the perimeter of the disc, the label must be applied not only in centered fashion, but must also be aligned in the proper radial direction with respect to the disc perimeter or profile. It therefore becomes necessary to label and manufacture non-round compact discs to insure that the label is properly aligned in the desired orientation.

Is it currently considered to be a requirement that compact discs have a circular outer profile, based on the process by which information is read on the compact disc by a reading machine, such as a compact disc player. The disc rotates about a central axis in a receiving tray of the player with respect to a laser-based reading element, and therefore, the information on the disc must be arranged in a circular fashion. Since the disc must rotate within the player, it is of course most convenient to have the disc as a whole shaped with a circular outer profile, with the player shaped to receive the circular disc.

However, it has now been discovered that it is possible to provide a compact disc having a non-circular outer profile. FIG. 1 shows a heart shaped compact disc in bottom plan view, although any non-circular disc is within the scope of the invention. The radius $r_1$, of such a non-round disc 2, measured from the center of the disc (i.e. the center of the center hole 10) to the furthest point 6 on the outer profile 8, should be sized to fit within the usually round receiving tray of an appropriate CD player. In other words, the radius $r_1$ must be less than or equal to the inside diameter of the receiving tray. However, since the non-circular compact disc will have the usual center hole 10 found on standard round compact discs, these non-circular discs will also properly spin within the receiving tray of a CD player.

While the outer profile of the CD of the invention may be of non-round shape, the readable digital information 12 provided on the disc must be provided in the usual annular arrangement. However, in order to insure that all of the intended information will be readable, the outer limit 14 of the annularly arranged information region must not extend beyond the innermost point 16 of the outer profile 8.

Compact discs generally possess a so-called stacking ring about the center of the disc, which acts as a spacer to prevent damage to the disc surface when stacked with other discs. However, the spaces resulting between the stacked discs become problematic during a shaping process in which a plurality of stacked discs are simultaneously shaped. In particular, dust and other debris from the shaping process tends to enter the interstitial area between discs and could result in damage to the delicate disc surface.

SUMMARY OF THE INVENTION

It is therefore an object of the present invention to provide a process which insures that the labels applied to the non-round compact discs are properly aligned with respect to the outer profile of the disc.

It is a further object of the invention to provide a process for mass producing non-round compact discs in a convenient and cost-efficient manner, while protecting the integrity of the information on the disc from damage.

BRIEF DESCRIPTION OF THE DRAWINGS

The method and apparatus are described in detail with reference to the following drawings:

FIG. 2 is a top plan view of the compact disc of FIG. 1.

FIG. 3A is a top plan view of a shaping platform.

FIG. 3B is top plan view of labeled, compact disc blank before being shaped.

FIG. 3C is a side, exploded view of the platform of FIG. 3A, showing a number of compact disc blanks, a shaping form and a shaping tool.

FIG. 3D is bottom perspective view of the shaping form.

DETAILED DESCRIPTION OF THE INVENTION

A compact disc to be fashioned into a disc having a non-round outer profile is first imprinted with laser-readable digital information arranged in an annular region on the underface of a blank, which may be round. The digital information region should conform to the limitations discussed above with respect to the dimensions of the desired outer profile to be achieved.

Figure 1:
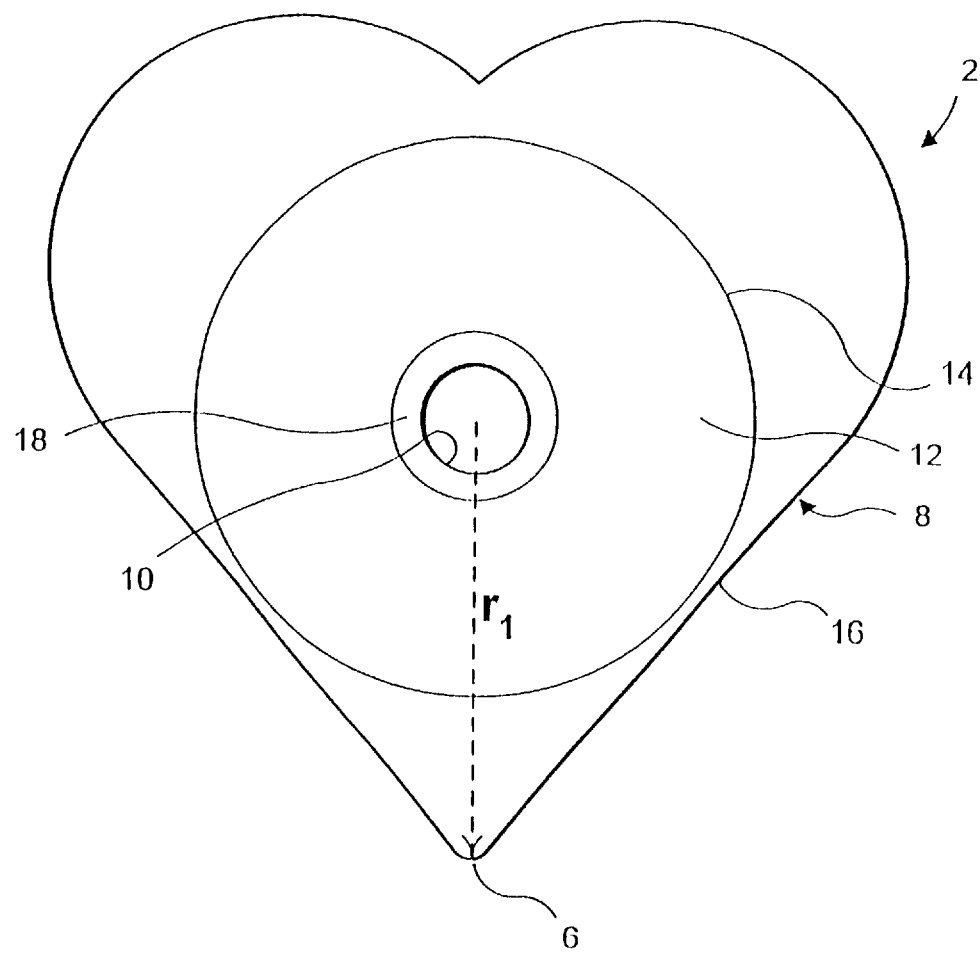
FIG. 1 is a bottom plan view of a compact disc formed according to the process of the invention.
Figure 3E:
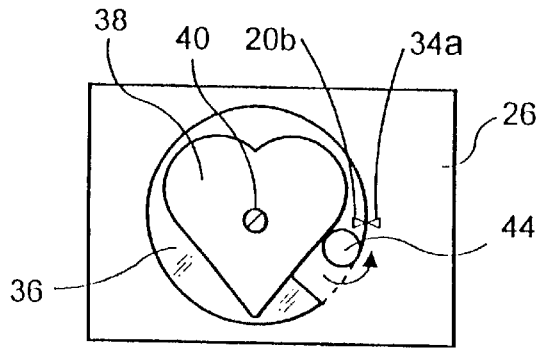
FIG. 3E is a top plan view of FIG. 3C, showing a shaping step in progress.

In a first embodiment of the process, the compact disc having digital information thereon will then have applied to its upper face an opaque label in the known manner such as by way of a screen printing process. FIG. 2 shows a top plan view of the compact disc of FIG. 1, having a label 22 applied thereto. The label may cover all or part of the upper face, leaving open only the center hole. From this view, it can be appreciated that it is important that the label be properly aligned with respect to the outer profile of the non-round compact disc; such a concern is not present for circular discs.

The compact disc blank may have a transparent annular region 18 immediately adjacent to and located outwardly of the center hole 10. The transparent annular portion will not contain digital information, as the annular digital region 12 will be located outward of the transparent region 18. In the drawing shown, the label is optionally applied to cover most of the transparent region. Similarly, a transparent region may be present elsewhere on the compact disc, such as towards the outer perimeter.

At least one transparent marking 20a or 20b is formed in the transparent region by leaving a portion of that region uncovered by the label. In the alternative, a marking can be located in the transparent region 20 by the reverse procedure, i.e. by leaving a larger portion of said region transparent and then placing a portion of the label or some other form of opaque marking within said larger portion to thereby serve as a marking element. It will be contemplated that any such arrangement involving the location of opaque and/or transparent or translucent markings within the transparent region may be used to form a marking element, which marking element will be used to properly align the labeled compact disc blank during the subsequent process during which the non-round outer profile is imparted.

With respect to FIGS. 3A–3E, a manufacturing platform 26, preferably made of a strong material such as metal is provided. A shaft 28, rotationally fixed with respect to the platform extends upwardly for fittingly receiving one or more labeled compact disc blanks 36 by way of the center holes 10 thereof. The platform is provided with an alignment marking 34 which allows alignment with the marking 20 of the compact disc blank. The platform marking 34 may be located or fashioned in any manner which would allow for proper aligning of the blanks. For example, the platform marking 34a may be located such that it can be seen through the corresponding transparent marking 20b. Also, the platform marking 34b may be located clear of the point to which the blank will extend when placed on the platform to allow an alignment based on any corresponding marking on the blank. A similar alignment marking, such as a longitudinal line may be placed on the shaft to allow alignment with a marking placed along the edge of the center hole of the blank.

A form 38 is provided with an attachment means 40 which corresponds with an attachment means 41 on the shaft, to permit the form to be removably fixed to the shaft during the shaping process. In the embodiment shown, the means 40 is a screw while the means 41 is a conforming screw hole, however, it should be clear that these may be reversed, or that any means for removably fixing the form 38 to the shaft 28 may be employed. In order to be sure that the form is properly aligned with respect to the shaft, and hence the platform, an anti-rotation alignment means 32 is provided which co-acts with a conforming means 42 on the form 38. In the drawing, the means 32 is shown as two pins and the means 42 is shown as two holes for conformingly receiving the pins. Again, it should be clear hat any known anti-rotation means may be provided, such as single pin having a non-circular cross-section and a conforming receiving hole; and that the location of the pin and hole may be reversed.

The form 38, preferably made of a hard material such as metal, will have the shape of the intended outer profile of the compact disc, and the form should have some degree of thickness in order to support the later force of a grinding tool 44 applied thereagainst.

Once the form 38 is fixed to the shaft 28, and the compact disc blanks 36 are secured against movement, the shaping step is achieved by removing the portion of the blank 36 extending beyond the form 38 by way of a shaping tool. The shaping tool may be any suitable device, and is shown as a rotating grinding tool 44 which is against the edge of the blank until it meets the abutting edge 48 of the form 38, and then follows the form about its perimeter until the entire blank has been shaped into the desired final compact disc product. It should also be realized that the rotating grinding tool may remain stationary while the platform, along with the blank and form fixed thereto, is moved about the tool.

Figure 4:
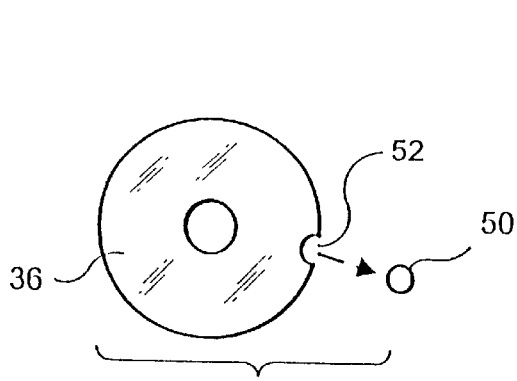
FIG. 4 is a top schematic view showing an alternate alignment method.

In an alternative embodiment, (see FIG. 4) the steps set forth above are followed except that the alignment of the blank with respect to the platform is accomplished in a physical, rather than visual, manner. Before the compact disc blanks are placed on the platform for shaping, a cut-out is made in the blank at a location which does not contain digital information. The cut-out may be in the form of a notch 52 in the edge of the blank, which then co-acts with a conforming alignment shaft 50 which extends perpendicularly from the platform. The cut-out may also be in the form of a hole in the blank other than the center hole, which hole then fits about the alignment shaft.

Figure 5:
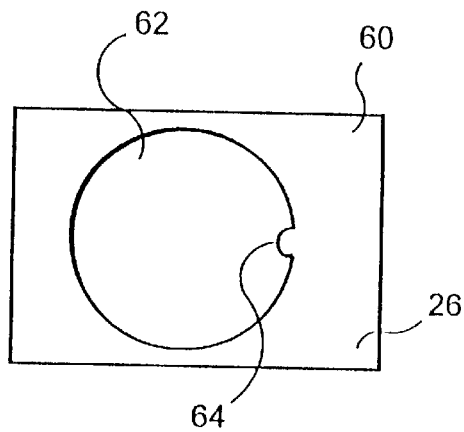
FIG. 5 is a top plan view of an alternate platform.

A further embodiment performs (see FIG. 5) the alignment step by way of the cut-out notch 52 described above. However, rather than an alignment shaft extending from the flat face of the platform, the platform 26 is provided with a recess 62 sunken with respect to the face 60 of the platform. The recess has the general shape of a round blank to be conformingly received therein, while also having an inward protrusion 64. The protrusion will fit within the notch 52 in the blank to perform the alignment step. The shaping step is then accomplished by way of a properly shaped die which stamps out the desired profile. An alternative shaping step may be performed, wherein the recess 62 is further fashioned as a, e.g. female portion of a mold, corresponding with a male portion of a mold, which co-act upon stamping to produce the compact disc of the desired shape.

Figure 6:
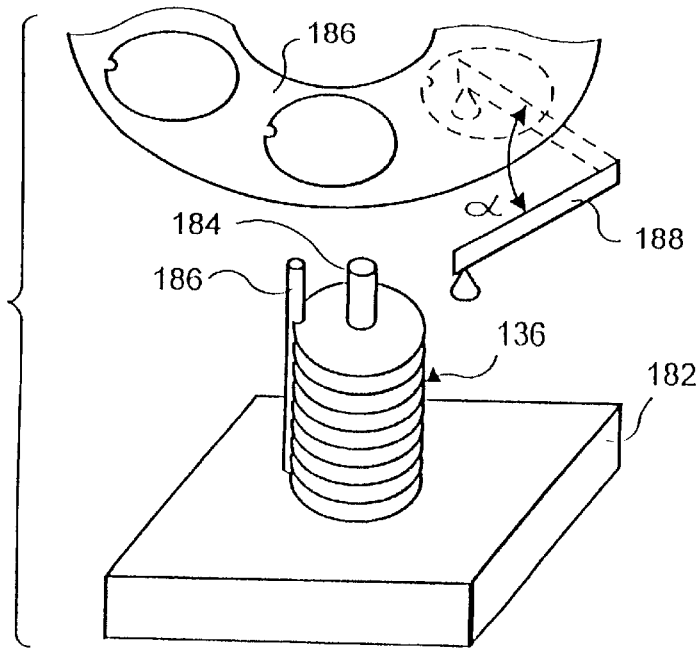
FIG. 6 is a perspective and schematic view of an embodiment of labeling apparatus.

In a still further embodiment (see FIG. 6) related to automated production of the shaped discs, round blanks are provided with a notch 152, e.g. a semi-circular notch, in the edge thereof. This can be achieved by any convenient means, such as simultaneous milling of a stack of discs. A plurality of notched discs 136 are then stacked onto a spindle 184 by way of their center holes. A guide spindle 180, conforming to the shape of the notch on each disc, is provided on the stacking platform at a distance from and parallel to the center spindle, such that all of the notched discs can be aligned together and held in position by the guide spindle.

The notched discs are then removed one at a time, preferably by suction by way of a robot arm 188, and are loaded onto a standard apparatus 186 for printing labels on a compact disc. It is important that the robot arm consistently place the notched discs onto the printing tray with a consistent rotational motion, such as through a set angle, so that the notch or other alignment means is always located in the same position with respect to the label to be printed on the disc.

The labeled discs are then taken to the shaping apparatus. Again, the notch 152 is used to correctly position each labeled disc with respect to the particular shape to be imparted to the profile of the disc. Thus, the labeled discs may be loaded onto a center shaping spindle 192, and held in place by a guide spindle 174 projecting from the shaping platform. The shaping procedure is then coordinated with the automatically positioned discs to provide a shaped profile to the discs which conforms to the label.

A still further method for insuring the alignment of the label and shaped profile of the disc involves providing a sensor-readable mark on the disc during the labeling process. In this embodiment, normal round blank discs may loaded on the center spindle of the labeling apparatus without regard to rotational position. During the printing step, a sensor mark is printed on, or otherwise provided on the surface of the disc. The sensor mark may be any mark which is machine-readable, such as by virtue of its shape, color, wavelength, pattern, composition, or other physical characteristics. The mark should be preferably placed on a portion of the disc which will be cut away during later shaping; however, this may not be of concern if a mark is provided which is not visible under ordinary circumstances.

Once the discs are labeled with the sensor mark, they may be notched as above in relation to the mark, either at the mark itself, or at a set distance from the mark. The notches may be provided by any convenient means, such as by milling a plurality of stacked discs. The notches are then used to properly orient the discs during the shaping procedure.

Alternatively, the notches can be dispensed with altogether in a totally sensor driven procedure. In such a case, the discs may be aligned on the shaping spindle automatically by way of a sensor in communication with a stacking means on the shaping platform.

Figure 7:
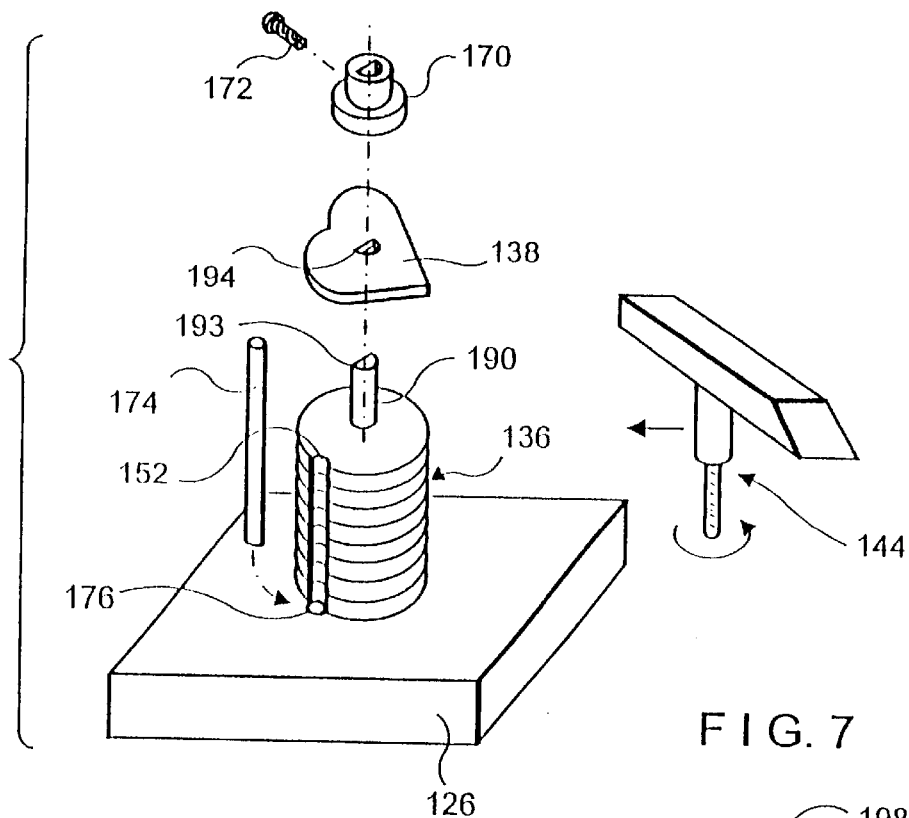
FIG. 7 if an exploded perspective view of an embodiment of a shaping apparatus.
Figure 8:
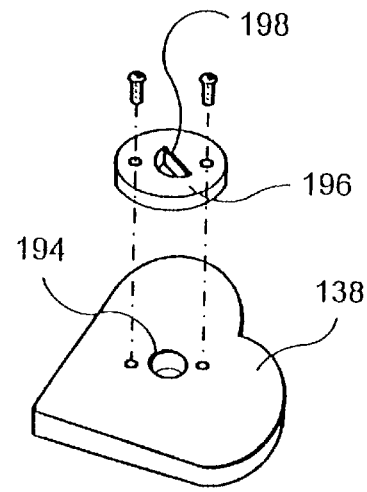
FIG. 8 is an exploded perspective view of a shaping form and spindle adapter.

As shown in FIG. 7, a preferred shaping procedure involves the use of a milling bit 144 on a shaping platform 126. Preferably, a plurality of labeled discs 136 are properly aligned on a shaping spindle 190. A guide spindle 174 may be present on the platform to perform an initial alignment on the shaping spindle 190. Once the discs are secured against rotation by other means (see below), the guide spindle may optionally be removable to prevent interference with the milling apparatus. Advantageously, the spindle 192 may have a round cross-section with a portion cut away 193. A shaping form 138 is then placed on top of the stack about the spindle 190. In order to insure that the form 138 is properly aligned with the discs 136, the center hole 194 in the form should conform 195 to the cross-section of the spindle in order to have it retained against rotation on the spindle. Alternatively (see FIG. 8), for ease of manufacture of the form, the form can simply have a circular center hole. When in use, a spindle adapter can be secured to a face of the form. While the form could also have a notch which is alignable in a guide spindle, this would not be preferable as it could interfere with an uninterrupted milling of the outer profile. The form is then secured in place by way of a collar 170 and set screw 172 or the like, or any known means which can apply pressure from above, in such a manner as to supply sufficient pressure against the stack of discs so as to prevent rotation of the discs during milling.

Figure 9:
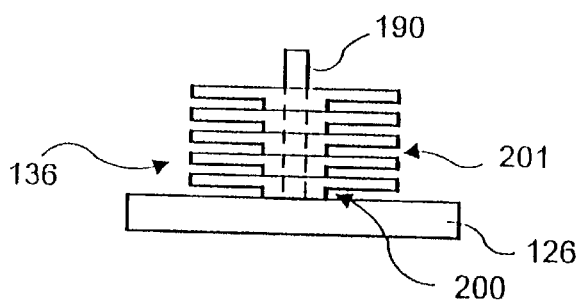
FIG. 9 is a side plan view of stacked discs on a shaping platform, shown in exaggerated dimension to emphasize the effect of the stacking rings and interstitial areas.

A particular problem arises during the simultaneous milling of a stack of discs by virtue of a stacking ring 200 (see FIG. 9) provided as a standard component of all compact discs. Such stacking ring 200 rises slightly above the surface of the disc, to insure separation during stacking with other discs during the manufacturing process in order to prevent damage to the disc surface from another disc. However, during the milling of a plurality of stacked discs, the separation between discs by virtue of the stacking rings provides an opportunity for dust and other milling debris to enter the area between the discs, and to thereby damage the disc surface.

Figure 10:
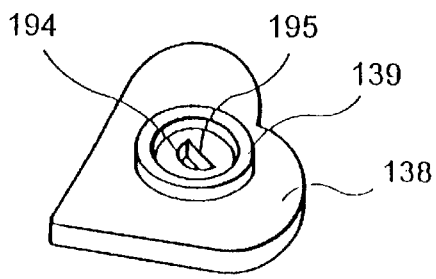
FIG. 10 is a bottom perspective view of a shaping form having a lip of the invention.

In order to overcome this problem, the applicant has discovered that by providing a specialized form, this can be avoided. In particular, with reference to FIG. 10 showing an underside of a form, the shaping form 138 is designed with a downward projecting lip 139. The lip may follow the profile of the form shape, or may simply be of a general ring shape. Alternatively, the lip may be provided as a separate ring for placement under a form.

Figure 11:
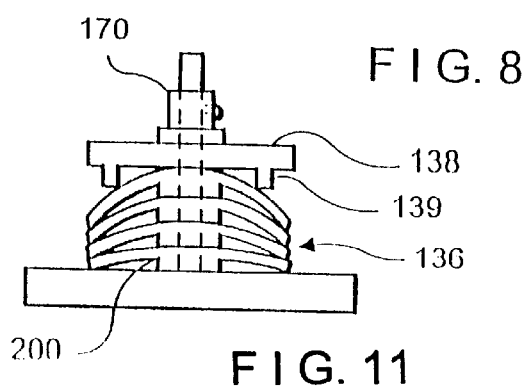
FIG. 11 is a side plan view of stacked discs on a shaping platform under deformation by way of a shaping form having a lip on the underside thereof, shown in exaggerated dimension to emphasize the effect of the stacking rings and interstitial areas.

When the form having a lip, or a form having a ring placed thereunder is applied with pressure to the stack of discs, the lip or ring acts to bend the outer portion of the discs downward, against the disc below, to thereby close off entry to the area 201 between the discs, and to prevent dust or debris from entering the area. This is seen if FIG. 11. It will therefore be appreciated that the lip or ring must be oriented at a minimum distance from the outer perimeter of the stacking rings to allow for a convenient amount of torque to applied to the stack in order to temporarily deform the discs as desired. In addition, the outer perimeter of the ring should be chosen with respect to the shape of the particular form being used, so as not to interfere with the grinding operation.

It should be clear that the lip or ring can also be provided against the bottom of the stack of discs, either in lieu of an upper location, or in addition thereto. Thus, a ring can be located beneath the bottom-most disc of a stack, either as a means permanently fixed to the platform, or being a separable item. When pressure is applied from above, the bottom ring will push upwardly to deform the discs in a similar fashion to that described above. By using simultaneous rings in the upper and lower portions, the deformation can be increased, and greater number of discs can be stacked and processed.

What is claimed is:

1. A method for manufacturing compact discs having a non-circular outer profile, comprising the steps of:

imprinting digital information in an annular region on the under face of a compact disc blank such that an outer limit of the annular region does not extend beyond the innermost reach of the edge of the compact disc in its final shape, applying a label to the upper face of the blank, forming a first alignment means on the blank, placing the blank on a shaping platform having a second alignment means such that the first and second alignment means are in a mutually aligned position, securing the blank against rotation with respect to the platform, and shaping the compact disc into its final shape by removing portions of the blank.

2. The method of claim 1, wherein the shaping step comprises providing the blank on the platform having a fixed shaft extending perpendicular to the platform, which fixed shaft conforms to a center hole present in the blank, and providing the blank about the shaft to prevent lateral movement of the blank, removably fixing a shaping form to the shaping apparatus, and shaping the compact disc by using a shaping tool to follow the external lateral contour of the form.

3. The method of claim 2, wherein the form is fixed against rotation to the shaft.

4. The method of claim 2, wherein the shaping tool is a rotating grinding tool.

5. The method of claim 1, wherein the first and second alignment means comprise visually-identifiable marks.

6. The method of claim 1, wherein the first alignment means comprises a notch in the edge of the blank, and the second alignment means comprises a shaft having a cross-section which conforms to the notch and which extends from the surface of a shaping platform.

7. The method of claim 1, wherein the platform has a recess shaped to retainingly receive the blank, the first alignment means comprises a notch in the edge of the blank, and the second alignment means comprises a conforming protrusion extending radially inwardly from the lateral edge of the recess.

8. The method of claim 7, wherein the shaping step is accomplished by way of stamping with a die.

9. The method of claim 7, wherein the recess has formed thereon a first mold corresponding to a die stamping second mold, the first mold being one of a male or female portion, and the second mold being the other, and the shaping step being accomplished by way of stamping.

10. A method for manufacturing compact discs having a non-circular outer profile, comprising the steps of:
   imprinting digital information in an annular region on the under face of a compact disc blank such that an outer limit of the annular region does not extend beyond the innermost reach of the edge of the compact disc in its final shape,
   forming a first alignment means on the blank,
   applying a label to the upper face of the blank,
   orienting the blank on a shaping apparatus by way of the first alignment means with respect to a third alignment means on the shaping apparatus,
   securing the blank against rotation with respect to the shaping apparatus, and
   shaping the compact disc into its final shape by removing portions of the blank.

11. The method of claim 10, further comprising the step of orienting the blank on a labeling apparatus by way of the first alignment means with respect to a second alignment means on the labeling apparatus.

12. The method of claim 11, wherein a readable mark is applied as part of the labeling step, the readable mark comprising the first alignment means.

13. The method of claim 12, wherein the first alignment means further comprises a cut-out imparted to the disc after the labeling step in relation to the readable mark.

14. The method of claim 10, further comprising providing the disc on a spindle on the shaping apparatus, and providing a shaping form on the spindle.

15. The method of claim 14, wherein the discs is shaped by a rotating milling means which follows the outline of the form.

16. The method of claim 14, wherein the spindle has a generally round cross-section corresponding to the circular inside perimeter of the center hole of the disc, but which cross-section of the spindle also has a cut away portion, and wherein the form has a center hole corresponding to the outside perimeter of the spindle to prevent rotation of the form on the spindle.

17. The method of claim 14, wherein the spindle has a generally round cross-section corresponding to the circular inside perimeter of the center hole of the disc, but which cross-section of the spindle also has a cut away portion, and wherein the form has a generally circular center hole corresponding to the outside perimeter of the spindle and has removably secured to a face thereof an adapting means having a center hole with a cut away portion which corresponds to the cut away portion of the spindle to prevent rotation of the form on the spindle.

18. The method of claim 14, wherein the disc is secured against rotation about the spindle by virtue of pressure applied downwardly on the disc.

19. The method of claim 14, wherein a plurality of discs are stacked on the shaping spindle for simultaneous shaping, and wherein a deformation means is provided which deforms the discs toward the outer perimeter thereof to thereby initiate a contact between successive discs to effectively close off the space between successive discs.

20. The method of claim 14, wherein the deformation means comprises a ring or lip having an inside diameter at least greater than the outside diameter of a stacking ring on the compact disc, and such ring is located between a fixed support and the disc surface.

21. An apparatus for manufacturing compact discs having a non-round outer profile, comprising
   first means for retaining a plurality of round discs in a stacked fashion,
   second means for aligning the discs in a desired rotational orientation,
   third means for retaining the plurality of stacked discs against rotation,
   a shaping form, the outer profile of which corresponds to the desired outer profile of the discs, and a means for preventing rotation of the shaping form as well as means for orienting the form rotationally with respect to the discs,
   a shaping means which follows the outer profile of the shaping form while cutting away the outer profile of the discs to achieve the desired shape.

22. The apparatus of claim 21, wherein the first means is a spindle having a generally circular cross-section with a cut away section, and wherein the shaping form has a central hole means conforming to the cross-sectional profile of the spindle, such that the form can be retained on the spindle against rotation, while also orienting the form rotationally with respect to the discs.

23. The apparatus of claim 22, wherein the central hole means of the form having a shape conforming to the spindle is removably fixed to a face of the form adjacent the central hole thereof.

24. The apparatus of claim 22, further comprising a ring or raised lip, the inside diameter of which is at least greater than the outside diameter of a stacking ring on a compact disc, and the outside diameter of which is less than the outside diameter of the compact disc, to allow for a deformation of the outer portion of a plurality of stacked compact discs against each other upon pressure, the ring or raised lip being located against an abutting surface secured against vertical movement.

25. The apparatus of claim 24, wherein the ring or raised lip is formed as part of the underside of the form.

26. The apparatus of claim 21, further comprising a labeling apparatus, the labeling apparatus comprising a means for stacking blank discs, means for rotationally aligning said stacked discs and means for transferring discs from the stacking means to a labeling means such that the discs have a desired alignment during labeling.

27. The apparatus of claim 26, wherein the aligning means comprises an alignment spindle parallel to a stacking spindle, the alignment spindle conforming to an alignment notch on an outer edge of each disc.

28. The apparatus of claim 26, wherein the transferring means comprises a robot arm which transfers each disc from the stacking spindle to the labeling means through a set rotation of the disc.

* * * * *

UNITED STATES PATENT AND TRADEMARK OFFICE
CERTIFICATE OF CORRECTION

PATENT NO. : 5,882,555
DATED : Mar. 16, 1999
INVENTOR(S) : Joern Rohde, et al

It is certified that error appears in the above-identified patent and that said Letters Patent is hereby corrected as shown below:

On title page, insert the following item:
--[60] Provisional application No. 60/007,500 filed Nov. 22, 1995--

Column 1, line 4, insert the following:
--CROSS REFERENCE TO RELATED APPLICATION
Reference is made to and priority claimed from U.S. provisional application Ser. No. 60/007,500, filed Nov. 22, 1995, entitled APPARATUS AND METHOD FOR MANUFACTURING COMPACT DISCS HAVING A NON-ROUND OUTER PROFILE.--

Signed and Sealed this

Ninth Day of May, 2000

Attest:

Attesting Officer

Q. TODD DICKINSON

Director of Patents and Trademarks